UNITED STATES PATENT OFFICE.

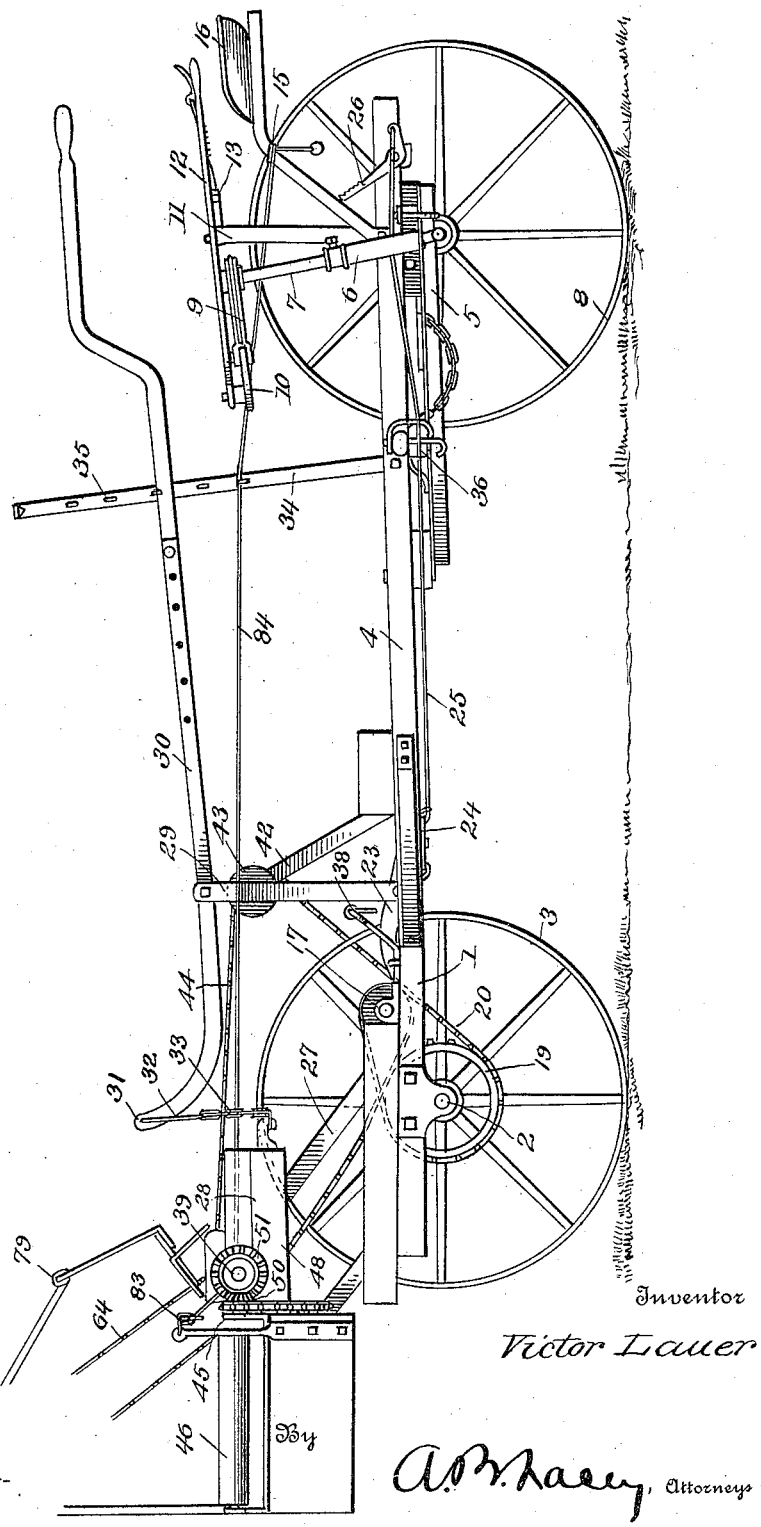

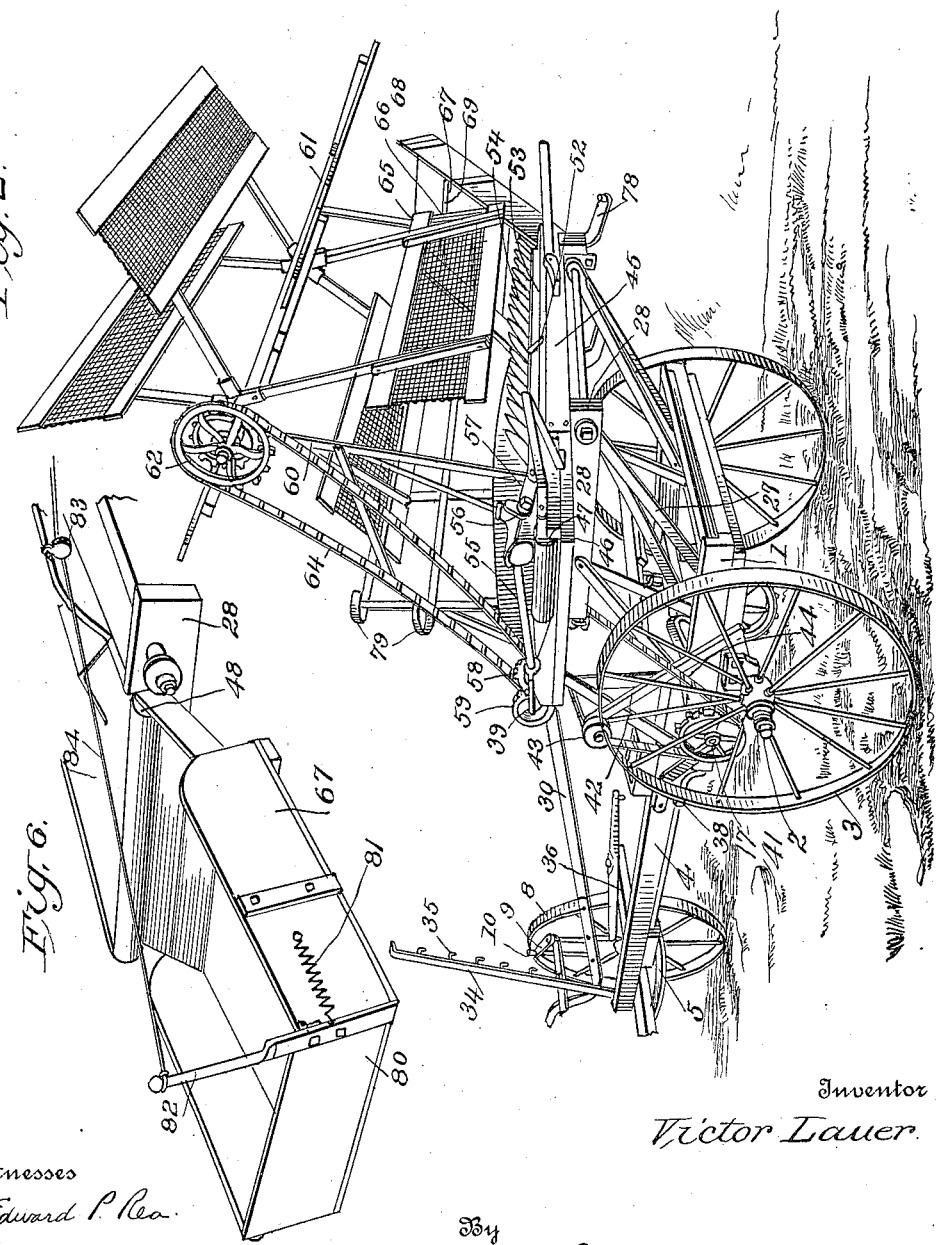

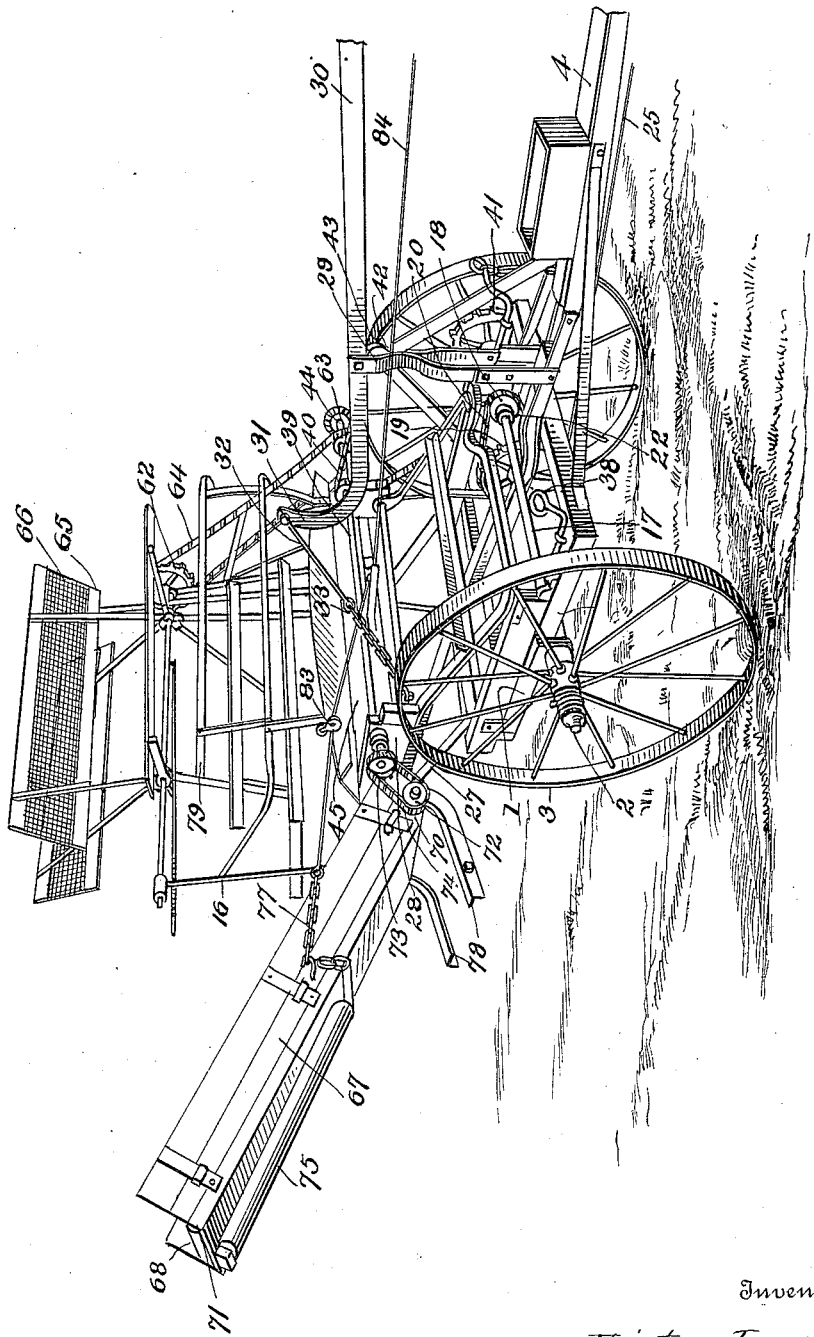

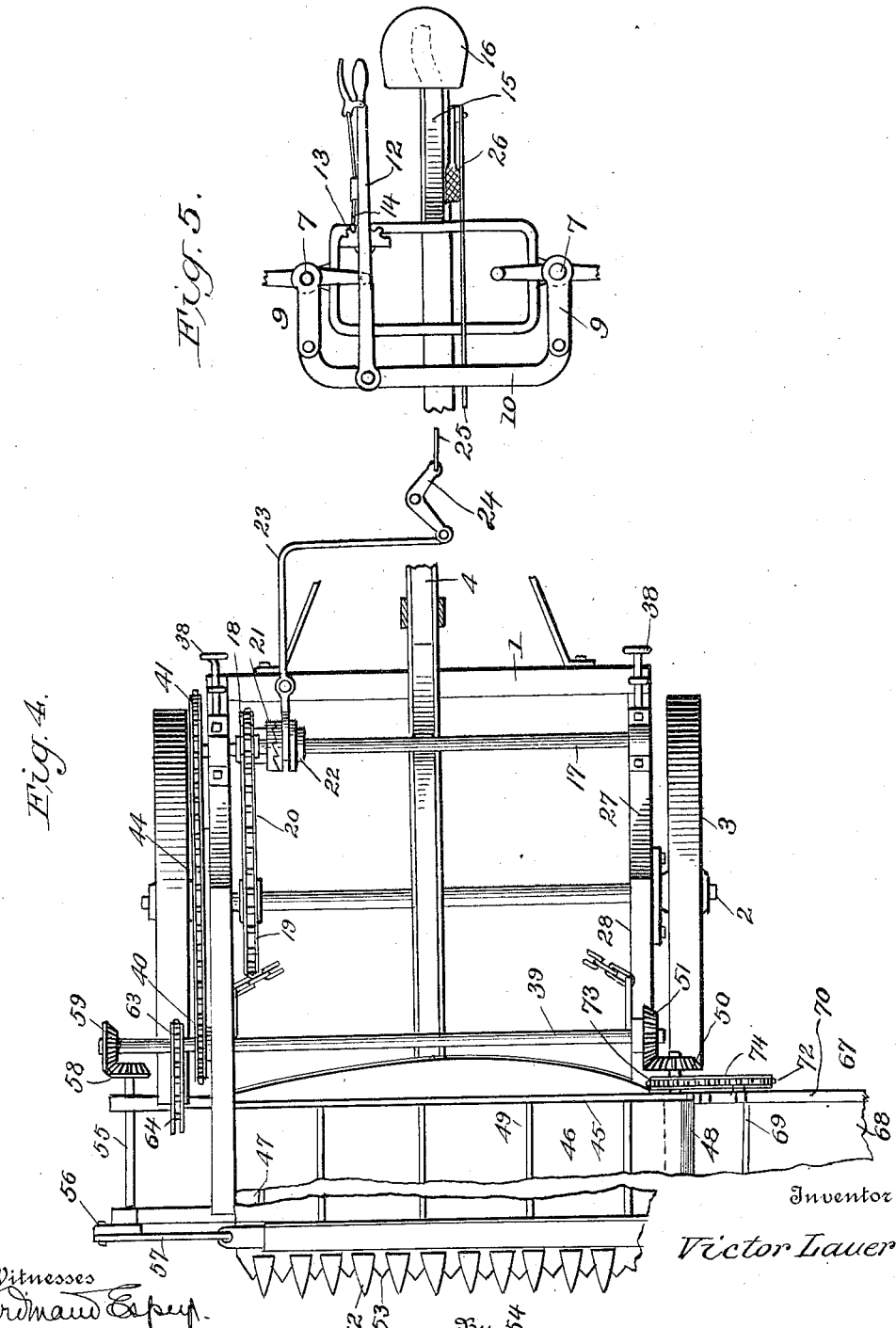

VICTOR LAUER, OF STILLWATER, OKLAHOMA.

HEADER.

1,052,833. Specification of Letters Patent. Patented Feb. 11, 1913.

Application filed November 25, 1911. Serial No. 662,497.

*To all whom it may concern:*

Be it known that I, VICTOR LAUER, citizen of the United States, residing at Stillwater, in the county of Payne and State of Oklahoma, have invented certain new and useful Improvements in Headers, of which the following is a specification.

This invention has relation to headers, and has for its object to provide a machine especially adapted to be used for removing the heads of Kafir corn from the stalks thereof by passing the machine along the rows. While the machine has especial adaptation as above indicated, the same principles may be used in machines for heading wheat or other grain.

An object of the invention is to provide an animal propelled machine having a forward supporting frame and a rear guiding frame, with a tongue connecting the said frames together. Space is provided between the said frames for the draft animals. Upon the forward frame is mounted for vertical adjustment a conveyer which is located in horizontal position and a cutting apparatus located in advance of the conveyer. A reel having open-work blades is journaled for rotation above the cutting apparatus and means is provided for operating the conveyer, the cutting apparatus and the reel from the supporting wheels of the forward frame. A trunk is pivotally mounted at the delivery end of the conveyer and may be used as means for elevating the material delivered from the conveyer and depositing the same in the body of a wagon which is drawn along with the header but by a separate team, or the said trunk may be converted into a receptacle for receiving the material as it comes from the conveyer.

A still further object of the invention is generally to improve this class of apparatus so as to increase their utility, durability and efficiency.

Further objects and advantages will appear in the following description, it being understood that various changes in form, proportions and minor details of construction may be resorted to within the scope of the appended claims.

For a full understanding of the invention reference is to be had to the following description and accompanying drawings, in which:

Figure 1 is a side elevation of the header with parts removed; Fig. 2 is a perspective view of one end portion of the header, viewing the same from one side; Fig. 3 is a similar view, viewing the header from the side opposite to that illustrated in Fig. 2; Fig. 4 is a top plan view of part of the header, showing parts removed and parts in section; Fig. 5 is a top plan view of part of the steering apparatus of the header; Fig. 6 is a perspective view of a trunk used upon the header, showing a gate applied thereto.

Corresponding and like parts are referred to in the following description and indicated in all the views of the accompanying drawings by the same reference characters.

The header consists of a forward frame 1 which is mounted upon an axle 2. The said axle is journaled in its bearings and traction wheels 3 are mounted at the ends of the axle. These wheels are provided at their hubs with the usual escapement devices so that when the machine moves in a forward direction the axle is rotated, but when the machine is moved in a rearward direction the wheels rotate but the axle remains at rest. Such an expedient is common in agricultural machines and for this reason it is deemed unnecessary to explain this detail further.

A rearwardly disposed tongue 4 is connected with the rear portion of the frame 1 at a point approximately midway between the ends thereof. The rear portion of the tongue 4 is supported upon a frame 5 which in turn carries upstanding sleeves 6. The shank portions of L shaped spindles 7 are journaled in the sleeves 6, and supporting wheels 8 are journaled upon the lower outstanding end portions of the said spindles. Forwardly disposed arms 9 are fixed to the upper ends of the spindles 7 and are pivotally connected together by a cross bar 10. A standard 11 is mounted upon the rear portion of the tongue 4 and a lever 12 is fulcrumed at the upper end of the said standard. The forward end of the lever 12 is pivotally connected with the cross bar 10 at a point approximately midway between the ends thereof. A dentate segment 13 is carried at the upper end of the standard 11 and the lever is provided with a spring actuated pawl 14 which is adapted to engage the teeth of the segment 13 and hold the lever in an adjusted position. By disengaging the pawl 14 from the teeth of the segment 13 the lever 12 is free to swing, whereby the cross bar 10 may be moved longitudinally and the arms 9 swung about the pivotal axes of the shanks of the spindles 7. Thus the said spindles 7 are turned and the wheels 8 journaled at the lower ends thereof are steered so that the machine is guided as it passes over the ground. A seat post 15 is mounted upon the rear portion of the tongue 4 and carries a seat 16.

A shaft 17 is journaled upon the frame 1 in parallel relation to the axle 2 and a sprocket wheel 18 is loosely mounted upon the shaft 17. A sprocket wheel 19 is fixed to the axle 2 and a sprocket chain 20 is trained around the sprocket wheels 18 and 19 and is adapted to transmit rotary movement from the axle 2 to the sprocket wheel 18. The sprocket wheel 18 is provided with a clutch hub 21 and a clutch member 22 is slidably mounted upon the shaft 17 but is constrained to rotate in unison therewith. A lever 23 is fulcrumed upon the frame 1 and engages the clutch member 22 for the purpose of shifting the same so that the said clutch member may be brought into engagement with the clutch hub 21 or moved out of engagement therewith.

A bell crank lever 24 is fulcrumed to the frame 1 and engages the rear end of the lever 23. A rod 25 is connected with one end of the bell crank lever 24 and extends back along the tongue 4 and is connected at its rear end with a foot lever 26 which is fulcrumed to the rear portion of the tongue 4 and may be operated by the foot of one occupying the seat 16. Therefore it will be seen that by swinging the foot lever 26 the rod 25 will be moved longitudinally, whereby the bell crank lever 24 will be swung which in turn swings the lever 23 and the clutch member 22 is moved as above indicated.

Frames 27 are pivotally mounted at their lower ends upon the frame 1 and are located at opposite sides of the axle 2. A frame 28 is pivotally connected with the upper or forward ends of the frames 27. A standard 29 is mounted upon the forward portion of the tongue 4 and a long lever 30 is fulcrumed to the upper end of the said standard. The forward end of the lever 30 is upwardly disposed as at 31 and rods 32 are pivotally connected to the upwardly disposed end 31 of the said lever. Chains 33 connect the lower forward ends of the rods 32 with the end portions of the frame 28 at the rear edge thereof. The rear end of the lever 30 is within reach of one occupying the seat 16. A bar 34 is mounted upon the intermediate portion of the tongue 4 and has upon one side outstanding pins 35. The intermediate portion of the lever 30 extends transversely across the bar 34 and the said lever is adapted to be engaged under any one of the pins 35 so that the lever will be held in an adjusted position. It will be apparent that by depressing the rear end of the lever 30 the forward end thereof will be raised and the rods and chains 33 will elevate the frame 28 which in turn will swing the forward portions of the frames 27 in an upward direction. The frames 27 maintain the frame 28 in a horizontal position or in a position parallel with the frame 1. Thus it will be seen that means is provided for raising and lowering the frame 28 and for holding the same at an adjusted position.

A doubletree 36 is pivotally connected with the frame 5 and is located under the intermediate portion of the tongue 4. Swingletrees are connected with the ends of the doubletree 36 and are located at the opposite sides of the tongue 4. Thus the draft animals may be connected with the machine and are positioned between the frames 1 and 5. Hitching eyes 38 are mounted upon the forward frame 1 and the collars of the draft animals may be connected with the said eyes whereby the frame 1 will serve as a neck yoke.

A shaft 39 is journaled at the rear portion of the frame 28 and a sprocket wheel 40 is mounted thereon. A sprocket wheel 41 is mounted upon the shaft 17 and a standard 42 is mounted upon the frame 1 and carries at its upper end an idler pulley 43. A sprocket chain 44 is trained around the sprocket wheels 40 and 41 and its upper run passes over the idler 43.

A conveyer trunk 45 is mounted upon the frame 28 and an endless belt conveyer 46 is mounted for orbital movement along the trunk 45. Rollers 47 and 48 are journaled at the ends of the trunk 45 and the belt 46 is trained around the said rollers. The belt 46 is provided upon its outer side with a series of transverse slats 49. The roller 48 is located at the delivery end of the trunk 45 and its shaft is provided with a beveled pinion 50 which meshes with a beveled pinion 51 mounted upon the shaft 39.

A cutting apparatus is located at the forward edge of the trunk 45 and includes forwardly disposed fingers 52. A knife bar 53 is mounted for movement transversely across the fingers 52 and carries a series of blades 54. A shaft 55 is journaled for rotation upon the frame 28 at the end of the trunk 45 and carries at its forward end a crank 56. A pitman 57 is pivoted upon the crank 56 and is pivotally connected with the knife bar 53. A beveled pinion 58 is fixed to the rear end of the shaft 55 and meshes with a pinion 59 fixed to the shaft 39. By this arrangement it will be seen that as the shaft 39 rotates rotary movement is transmitted through the intermeshing pinions to the shaft 55 which through the crank 56 and pitman 57 will reciprocate the knife bar across the fingers 52 and thus the cutting operation is accomplished. At the same time the pinions 50 and 51 will move the conveyer belt 46 along the trunk 45.

Standards 60 are mounted upon the frame 28, and a reel 61 is journaled at the upper ends of the standards above the cutting apparatus which has just been described. A sprocket wheel 62 is fixed to the shaft of the reel 61 and a sprocket wheel 63 is fixed to the shaft 39. A sprocket chain 64 is trained around the sprocket wheels 62 and 63 and is adapted to transmit rotary movement from the shaft 39 to the reel 61.

The reel 61 is provided with a series of blades which are made up of inner and outer bars 65. The bars of each set are spaced from each other and wire netting 66 is stretched across the space between the bars of each set. These bars and netting are adapted to come in contact with the heads of the corn and move the same in a rearward direction as they are severed from the stalks. At the same time the netting does not obscure the view of one occupying the seat 16 and consequently an operator upon the seat can see the heads of the plants so that he may judge and adjust the frame 28 to a position to cause the blades 54 to sever the heads a proper distance from their upper ends.

A trunk 67 is pivotally connected with the frame 28 at the delivery end of the trunk 45 and an endless belt 68 is mounted for orbital movement along the trunk 67. The belt 68 is provided upon its outer side with a series of transversely disposed slats 69. Rollers 70 and 71 are journaled at the ends of the trunk 67 and the said belt 68 is trained around the said rollers. The shaft of the roller 70 is provided with a sprocket wheel 72 and a sprocket wheel 73 is fixed to the shaft of the roller 48. A sprocket chain 74 is trained around the sprocket wheels 72 and 73. Thus means is provided for operating the belt 68 from the shaft 39. A roller 75 is journaled under the outer portion of the trunk 67 and when the outer end of the said trunk is disposed in an upward position, the roller 75 may engage the edge of the side board of a wagon body as the wagon is moved along at the side of the header. The roller 75 will thus assist in supporting the outer portion of the trunk 67 and will reduce the wear and friction between the body of the wagon and the trunk as the said body and trunk vary in position incident to the variation of the rate of speed at which the machine and the wagon may travel.

Arms 78 are fixed to the ends of the frame 28 and extend under the trunk 67. The outer end of the trunk 67 may be lowered and supported from the outer ends of the arms 78 so that the trunk may be held in a horizontal position or it may be held with its outer end portion downwardly disposed. The adjustment is desirable when it is intended to convey the heads to bags or other receptacles at the outer end of the trunk 67 or when it is intended to deposit the heads in rows upon the ground.

Spaced bars 79 are mounted upon the rear portion of the trunk 45 and are braced against the intermediate portion of the standards 60. These bars serve as frames for preventing the blades of the reel 61 from throwing the heads rearwardly over the rear edge of the trunk 45. At the same time the space between the bars 79 is sufficient to enable the operator to have an unobstructed view in front of the machine.

A gate 80 may be pivotally mounted at the outer ends and upper edges of the sides of the trunk 67 and is normally held in closed position against the end of the trunk 67 by means of springs 81 which are connected at one end with the said gate and at their other ends with the sides of the trunk. The gate 80 is provided with an upstanding arm 82. Pulleys 83 are mounted upon the rear portion of the trunk 45 and the frame 28, and a wire or cable 84 is connected at one end with the upper end of the arm 82. The intermediate portion of the cable 84 is trained around the pulleys 83 and the said cable is extended back along the tongue 4 and is attached at its rear end to the seat post 15. Therefore when the trunk 67 is in a horizontal position or is in a position with its outer end lowered, and after a sufficient amount of material has been collected therein, an operator may draw upon the cable 84, whereby the upper end of the arm 82 will be swung and the lower portion of the gate 80 will be moved away from the bottom of the trunk 67 and the lower portions of the sides thereof. Thus the accumulated material may gravitate into a receptacle (not shown) which may be attached to the outer end of the trunk, or the material may be permitted to fall upon the ground.

As shown in Fig. 3 of the drawing the forward end of the cable 84 may be connected with a chain section 77, which in turn is connected with the side of the trunk 67, and when the parts are so arranged the outer portion of the trunk 67 may be raised or lowered by moving the cable 84 and the chain section 77 longitudinally.

Having thus described the invention, what is claimed as new is:

1. A header comprising a wheel mounted base frame, frames pivotally mounted upon the base frame at the opposite sides of the axle of the supporting wheels, a top frame pivoted to the pivotally mounted frames, a shaft journaled upon the top frame, means for rotating the shaft from the supporting wheels of the base frame, a lever fulcrumed upon the base frame and connected with the top frame, and a cutting appartus mounted upon the top frame and operatively connected with the shaft.

2. A header comprising a wheel mounted base frame, horizontally spaced vertically swinging frames pivoted at their lower ends upon the base frame, a top frame pivoted to and extending between the upper ends of the vertically swinging frames, means acting upon said top frame to raise and lower the same, a cutting apparatus mounted upon the top frame, and means for operating said cutting apparatus from the supporting wheels of the base frame.

In testimony whereof I affix my signature in presence of two witnesses.

VICTOR LAUER. [L. S.]

Witnesses:
J. O. SNOWDEN,
HENRY B. HARTON.

Copies of this patent may be obtained for five cents each, by addressing the "Commissioner of Patents, Washington, D. C."